Sept. 25, 1956

T. ULRICH 2,764,221

SEAT BRACKET

Filed May 18, 1953

INVENTOR.
THEODORE ULRICH
BY
his ATTORNEY

Sept. 25, 1956  T. ULRICH  2,764,221
SEAT BRACKET

Filed May 18, 1953  2 Sheets-Sheet 2

INVENTOR.
THEODORE ULRICH
BY
his ATTORNEY

United States Patent Office 2,764,221
Patented Sept. 25, 1956

2,764,221

SEAT BRACKET

Theodore Ulrich, Detroit, Mich., assignor to American Motors Corporation, a corporation of Maryland Application May 18, 1953, Serial No. 355,613

3 Claims. (Cl. 155—7)

This invention relates generally to improvements in seat brackets and more particularly to an improved hair pin bracket for supporting the back of an automobile seat when in reclining position.

The primary object of this invention is to provide a hairpin-shaped bracket mounted adjacent the riser of the rear seat of an automobile to support the back of the front seat when such front seat is swung into a reclining position.

There are various devices for the purposes in question, some of them mounted under the cushion of the rear seat and necessitating movement of said cushion to place such device in position to support the back of the rear seat. Others are available and extend substantially outwardly and away from the rear seat riser but, in turn, offer obstructions which tend to cause discomfort and decided inconvenience to passengers in the rear seat especially when passengers enter or leave the rear of said vehicle or during the time such passengers are seated. These and other disadvantages in the earlier devices naturally tend to lessen the efficient operation and handling when said front seat is being used as part of an automobile bed or said rear seat is being used to seat passengers. These disadvantages are particularly noticeable with respect to making up an automobile bed and also cause damage to the seat cushions.

A particular feature of this invention therefore is to provide a stamping of substantial length and width comprising a pair of deep pockets along its entire width which is secured vertically to the inside of the riser to form a pair of spaced chambers open at each end. Access to said chambers is obtained through apertures formed in said riser through which the ends of a hairpin-shaped bracket may be inserted. The peculiar shape of the bracket is such that when positioned in the pockets, a portion of such bracket is practically flush with the rear seat cushion so that, unlike other bed seat supports, the load is carried vertically instead of horizontally.

Another object of this invention is to provide such a device which is strong and durable and economical in construction.

Still another object of this invention is to improve upon such types of devices now used for the purposes stated.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings.

Figure 1:
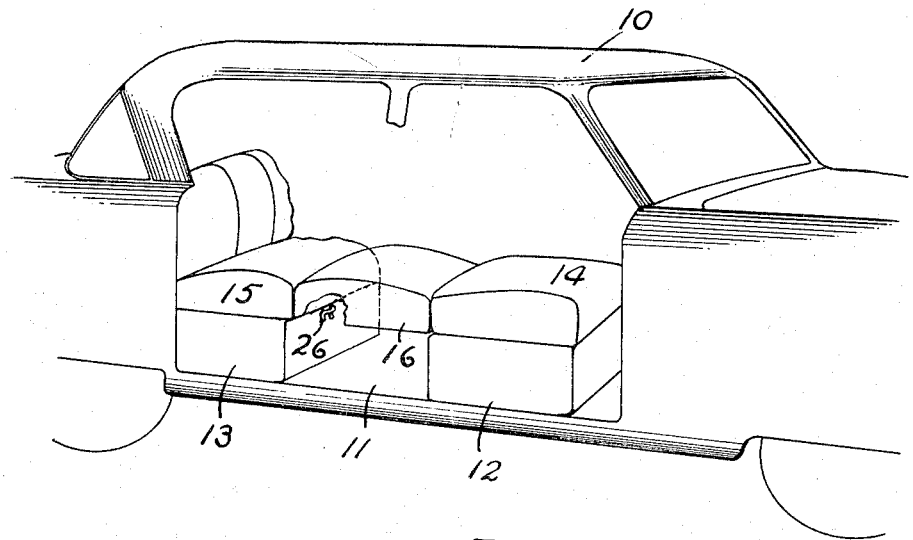
Figure 1 is a diagrammatic elevational view of an automobile employing the present invention.

Referring now in detail to the drawings, a vehicle body is indicated generally at 10 in Figure 1. Within the body there is provided a floor board 11 mounting the front seat frame 12 and the rear seat frame 13 upon which is mounted the front seat cushion 14 and rear seat cushion 15, respectively. The tilting seat back 16 is secured to the front seat frame 12.

Figure 2:
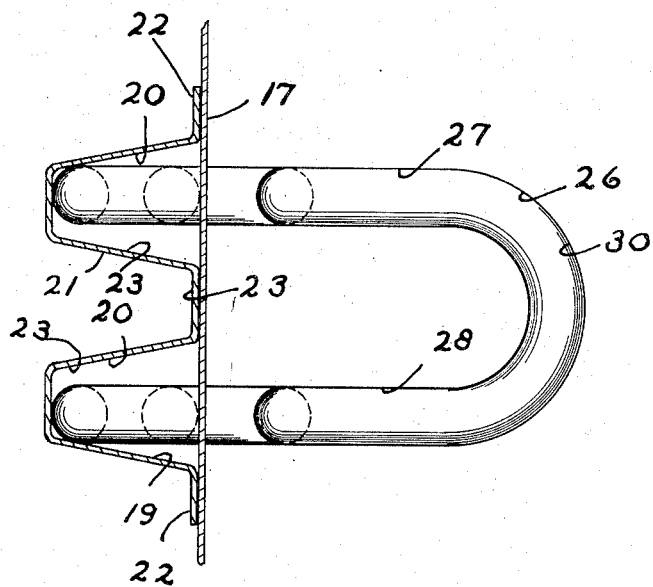
Figure 2 is a top plan view of the invention in operative position.
Figure 3:
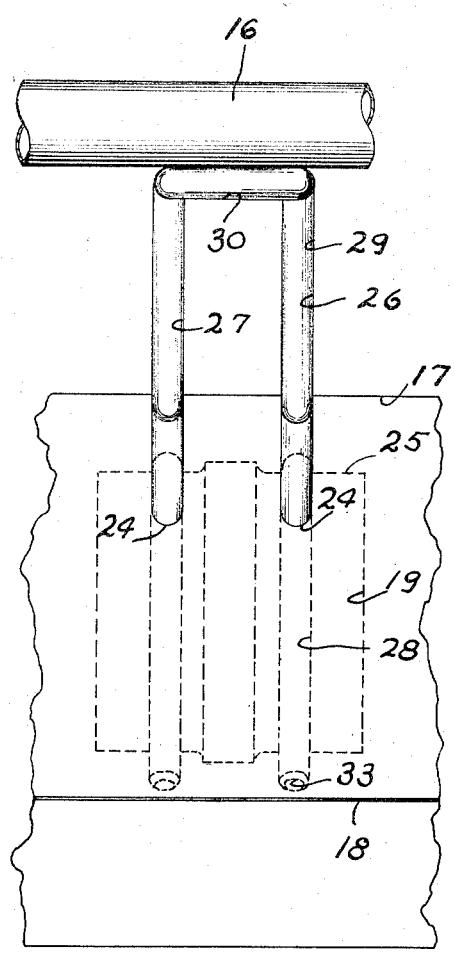
Figure 3 is a front plan view of the invention in operative position.
Figure 4:
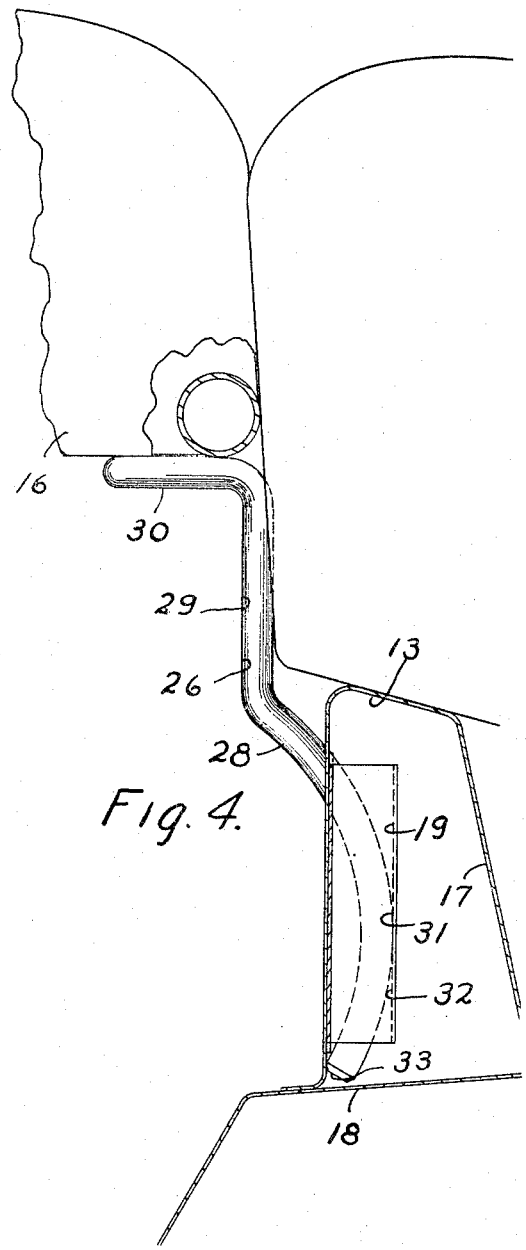
Figure 4 is a side view of the invention partly in cross-section showing the invention in operative position.

Considering now the construction shown in Figures 2, 3 and 4, inclusive, the rear seat frame 13 includes the riser 17 secured to the floor pan 18. Mounted upon the rear side of said riser 17 is a stamping 19. This stamping comprises two spaced pockets 20 separated by a similar pocket 21 in reverse from said spaced pockets. The free ends of said spaced pockets are bent to provide spaced flanges 22 with the base 23 of said intermediate pocket 21 in line with said flanges 22. This stamping is arranged on the riser with the flanges and the base anchored to said riser and the pockets 21 forming chambers 23 open at each end. Spaced apertures 24 are formed in the riser adjacent the top 25 of said stamping with each aperture communicating with one of said chambers.

Attention is directed to the single piece hairpin-shaped bracket 26. This bracket is formed from a piece of round stock and includes spaced and approximately parallel leg members 27 including curved lower sections 28 and straight upper sections 29. The upper sections are bent to provide a U-shaped supporting member 30 which extends at substantially right angles outwardly from the upper sections 29.

In operation, the spaced curved lower sections 28 are inserted into the apertures 24 with the outer curved surface 31 of each section 28 bearing strongly against the back wall 32 of each chamber 23 and part of the free ends 33 bearing strongly against a part of the riser 17. The mounting of the bracket 26 in the chamber 23 insures a rigid vertical support whereby any pressure on the U-shaped support will be absorbed vertically and not horizontally as in some previous constructions.

It is thought that the construction, manipulation, utility, and advantages of this invention will now be apparent to those skilled in this art without a more detailed description thereof.

The present embodiment of the invention has been described in considerable detail merely for the purpose of exemplification since in actual practice it attains the features of the invention and the above description.

It will be apparent that changes in the details of construction, and in the combination and arrangement of parts may be resorted to without departing from the spirit and scope of the invention as hereinafter claimed or sacrificing any of its advantages.

Having thus described my invention, what I claim is:

1. A bracket for temporary mounting in a riser attached to the rear seat of a motor vehicle, said bracket having a continuous U-shaped body structure with the closed end providing a horizontally displaced platform when said bracket is temporarily mounted in said riser, said bracket having a pair of parallel leg members depending from said platform at approximately right angles therefrom and with equal portions of said legs bearing against such rear seat and other equal portions of said legs adjacent their free ends being curved so that said free ends of said leg members may bear against the sides of said riser.

2. In combination with the rear seat frame and floor pan of a vehicle, a bracket and a riser, said riser having spaced apertures therethrough and arranged between the rear seat frame and floor pan, a stamping mounted on said riser having spaced pockets, said bracket having a continuous U-shaped body structure with the closed end bent to provide a horizontally displaced platform, said bracket having a pair of parallel leg members depending from said platform at approximately right angles therefrom, said legs being similarly curved at their lower ends and having similar straight upper sections, said bracket arranged to be removably mounted in said riser by inserting the curved portions through said apertures and in said pockets, and bearing against the sides of said riser and with the upper straight sections projecting above the riser.

3. In combination with the rear seat frame and floor pan of a vehicle, a bracket and a riser, said riser having spaced apertures therethrough and arranged between the rear seat frame and floor pan, a stamping mounted on said riser having spaced pockets, the rear walls of which extend upwardly beyond the level of the lower portions of the riser apertures, said bracket having a continuous U-shaped body structure with the closed end bent to provide a horizontally displaced platform, said bracket having a pair of parallel leg members depending from said platform at approximately right angles therefrom, said legs being similarly curved at their lower ends and having similar straight upper sections, said bracket arranged to be removably mounted in said riser by inserting the curved portions through said apertures and in said pockets and engaging and being guided by the rear walls of said pockets during insertion and then bearing against the sides of said riser and with the upper straight sections projecting above the riser.

References Cited in the file of this patent

UNITED STATES PATENTS

| | | |
|---|---|---|
| 549,049 | Batty | Oct. 29, 1895 |
| 995,234 | Emerson | June 13, 1911 |
| 1,654,726 | Graham | Jan. 3, 1928 |
| 1,701,417 | Minelli | Feb. 5, 1929 |
| 1,877,343 | Malby | Sept. 13, 1932 |
| 2,247,497 | Howell et al. | July 1, 1941 |
| 2,473,908 | Rubin | June 21, 1949 |
| 2,477,735 | Gentile | Aug. 2, 1949 |
| 2,576,343 | Hibbard et al. | Nov. 27, 1951 |